Jan. 1, 1963 | R. DI SABATINO | 3,071,380

SPINDLE ADAPTER

Filed Feb. 29, 1952 | 2 Sheets-Sheet 1

INVENTOR
Roland Di Sabatino
BY H. O. [signature]
ATTORNEY

SPINDLE ADAPTER

Filed Feb. 29, 1952 2 Sheets-Sheet 2

INVENTOR
Roland DiSabatino
BY H.L. Olluston
ATTORNEY

United States Patent Office 3,071,380
Patented Jan. 1, 1963

3,071,380
SPINDLE ADAPTER

Roland Di Sabatino, Oaklyn, N.J., assignor to Radio Corporation of America, a corporation of Delaware Filed Feb. 29, 1952, Ser. No. 274,151
20 Claims. (Cl. 274—10)

This invention relates to automatic record changers for phonographs and the like, and more particularly to automatic record changers of the drop type, which provide a central turn table spindle for holding and releasing records to be played. In such record changers, records drop from a stack on the spindle to the turntable successively, under control of record selecting and releasing means carried by the spindle.

Developments in the record changer art have resulted in the use not only of different playing speeds, but also of different spindle openings for present day records. Thus multi-speed record changers designed to play 78 r.p.m. and 33⅓ r.p.m. records have standard small diameter spindles. As presently known, most multi-speed record changers are provided with the standard small size turntable spindle, and, consequently only 78 and 33⅓ r.p.m. records may be played thereon. The larger spindle type 45 r.p.m. records must each be fitted with an adapter wafer having the small spindle opening in order to be played on such record changers. This situation is not cured by the fact that single speed 45 r.p.m. automatic record changers of the drop type employing a relatively large turntable center post and adapted to play 45 r.p.m. records are available. This is for the reason that, unless the adapter wafers are used for the 45 r.p.m. records, it is presently necessary, in order to conveniently play records having all types of spindle openings, to employ at least two separate record changers instead of one.

Accordingly, it is an object of this invention to provide means for adapting a single record changer of the drop type to automatically handle and play records having different size spindle openings, thereby obviating the necessity for more than one record changer in any complete record playing equipment.

There are at present on the market many drop type record changers of the type hereinbefore mentioned, which employ the standard small size turntable spindle. There are also at present many records of the enlarged center hole 45 r.p.m. type being produced. Accordingly, it is another object of this invention to provide simple and effective adapter means for automatic drop type record chaners of the standard small size spindle type for playing records of the enlarged center hole type.

Costs in present day automatic record changers must be kept to a minimum. Therefore, elaborate and complicated mechanisms must be avoided wherever possible. Furthermore, auxiliary parts to be handled by persons operating automatic record changers should be simple and accurate to a maximum degree, and at the same time should be capable of being applied and removed in the desired manner with great ease.

Acordingly, it is a further object of this invention, to provide a spindle adapter for automatic record changers of the drop type, which is fully effective with all types of records while being of simple, low cost design employing a minimum number of component parts, which functions reliably, and is easy to operate.

It is also an object of this invention, to provide an auxiliary spindle adapter for automatic record changers of the drop type which is of rugged construction and which is capable of giving dependable operation over a long operating life.

A type of record changer the present invention is adapted to accommodate, for playing different size spindle hole records, is that which employs a standard small size turntable spindle housing an ejector mechanism comprising a movable record push-off finger. Such a mechanism is the subject of U.S. Patent 2,523,045 to W. Miller et al. As disclosed in such patent, the push-off finger is operable periodically to effect sequential selection of successive lowermost records of a stack of records supported on the spindle above the turntable.

In accordance with one form of this invention, there is provided, for automatic photograph record changers of the type employing a standard small size turntable spindle having a record push-off finger, an adapter to be placed over said spindle comprising an auxiliary spindle of the diameter of the larger center hole records having a central, axially extending guide channel or socket for receiving the turntable spindle, such auxiliary spindle being of the interual diameter of the larger center hole records. Record changing apparatus housed in the auxiliary spindle comprises a pair of oppositely disposed record supporting shoulders or shelves and a pair of oppoitely disposed record separating blades or record separators. Mechanically linked slide members intercouple the shelves and separators, and spring biasing means normally biases the shelves outwardly, with the separators withdrawn inside the auxiliary spindle. Periodically, as the push-off finger of the turntable spindle is actuated, a projection on one of the linked slide members is engaged by the push-off finger to manipulate the shelves and separators in a desired manner.

The invention will be further understood from the following description with reference to the accompanying drawings, and its scope is pointed out in the appended claims. In the drawings:

Figure 1:
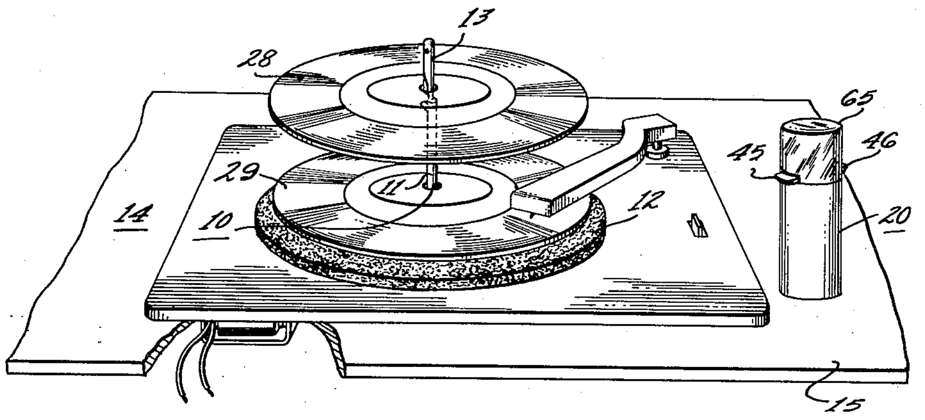
FIGURE 1 is a view in perspective of the top portion of a record changer and a detechable spindle adapter therefor, in a position of readiness for use with the turntable spindle in accordance with the invention.
Figure 2:
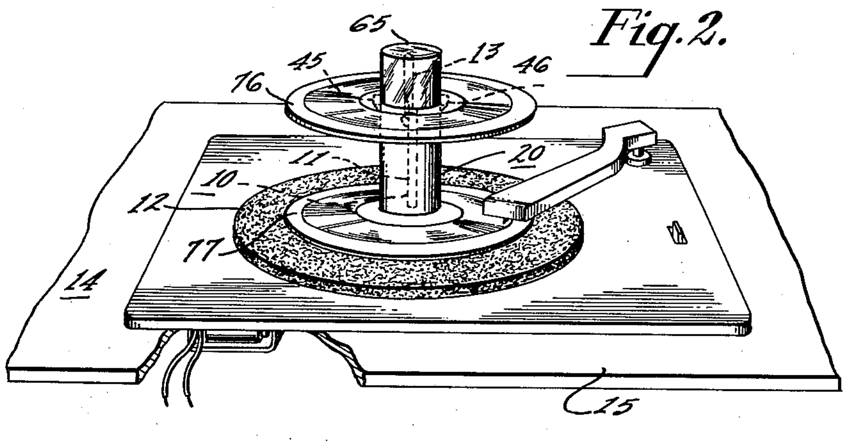
FIGURE 2 is a view in perspective similar to FIGURE 1, further showing the adapter in a position of cooperation with the turntable spindle, in accordance with the invention.

Referring to the drawing, in which like reference characters indicate like parts throughout, and referring more particularly to FIGURES 1 and 2, a multi-speed drop type record changer 14 of a type well known in the art employs a stationary spindle 10 having a shank 11 which projects through and above a turntable 12. A spindle head 13 extends above the shank 11 in eccentric relation thereto. Such a spindle arrangement is well known.

An arrangement such as that above described is adapted for playing a stack of records having center holes of the same diameter as the shank 11 and placed over the spindle head 13 with the lowermost record resting on a shoulder provided at the top of the shank 11 in a well known manner. During record playing intervals, a push-off finger member 16 of the type disclosed in the patent hereinbefore mentioned is biased inwardly and downwardly within the confines of the shank 11. Periodically, during record change cycles, an appropriate record change cycle control mechanism effects the movement of the finger 16 along and about a pin 17 to move the lowermost record to a position concentric with the shank 11 to drop therealong onto the turntable to be played, while other records of the stack are prevented from such movement by the spindle head 13 and the lower end of a slide 18 mounted in the spindle head. After the lowermost record of the stack has been selected in the above described manner, the remaining records of the stack lower a distance equal to the thickness of a record, the lowermost one of such remaining records resting on the shoulder. For details of the exact arrangement and operation of the finger 16 and its control mechanism, reference can be had to the aforementioned patent.

In accordance with the invention, a spindle adapter or auxiliary spindle 20, shown in FIGURE 1 resting on the top panel 15 of the record changer 14 during playing of records 28, 29 of the standard spindle hole type, of the diameter equal of records of the enlarged center hole type, is placed over the spindle 10 in the manner shown in FIGURE 2. As shown more clearly in FIGURE 3, the spindle 10 projects through a central bushing 21 provided in a main or spindle body portion 22 of the adapter 20. The bushing 21 has a keyway or guide channel 23 which aids in guiding the adapter 20 along the spindle 10 in a manner hereinafter to be explained.

Figures 3, 5, 6, 7:
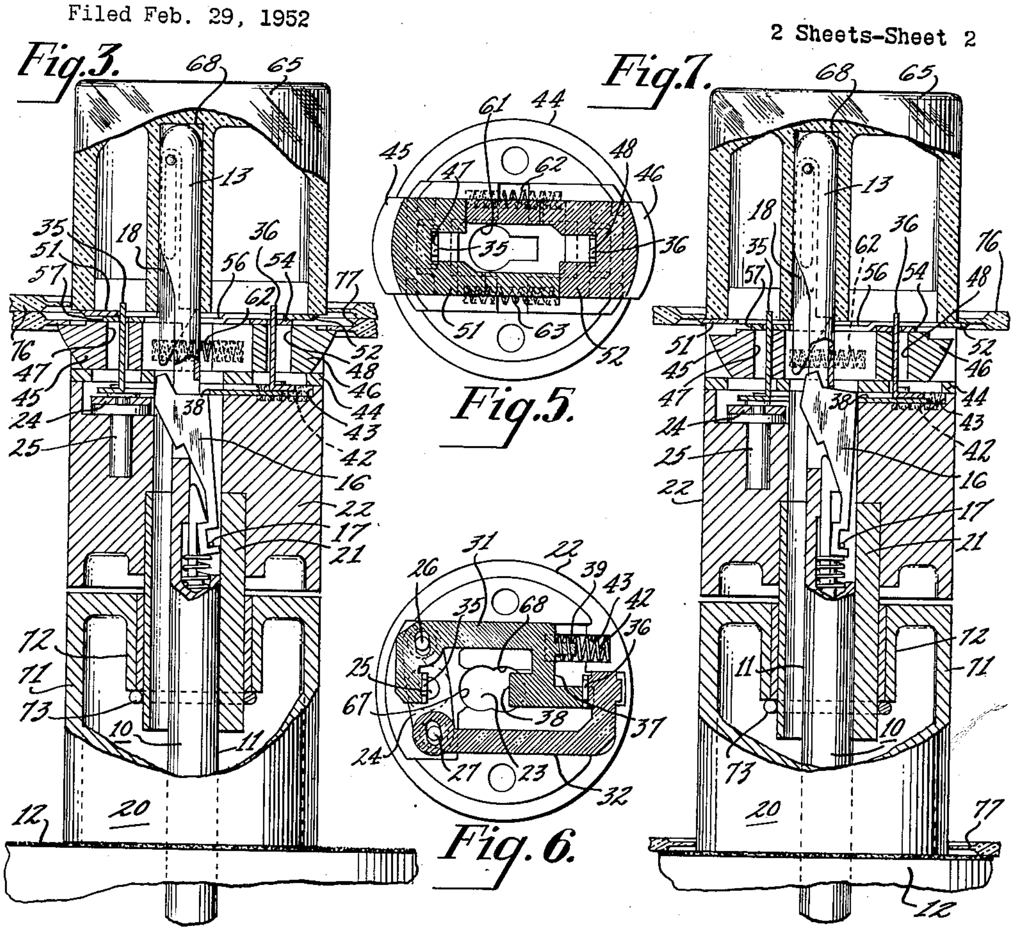
FIGURE 3 is a fragmentary view in elevation, and partly in section, of the spindle adapter and the turntable spindle in cooperative relation as shown in FIGURE 2 and on an enlarged scale, substantially full size.
FIGURES 5 and 6 are top plan views showing details of the arrangement of certain portions of the spindle adapter as shown in FIGURE 4 in a record playing interval.
FIGURE 7 is a fragmentary view in elevation, and partly in section, similar to FIGURE 3, showing the spindle adapter in operation during the record change cycle, further in accordance with this invention.
Figure 4:
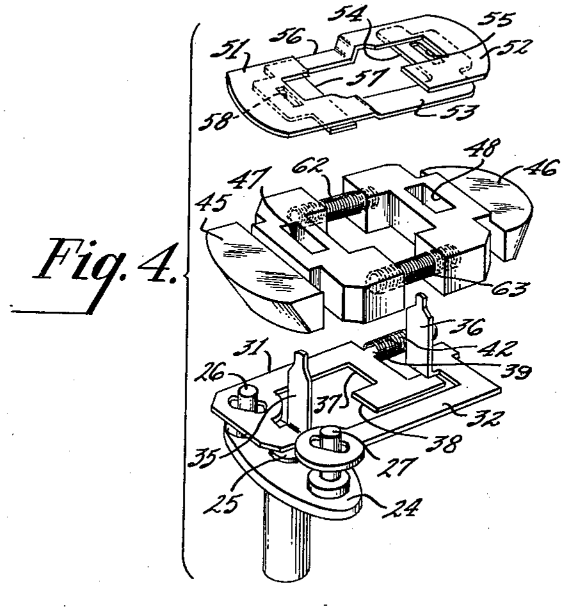
FIGURE 4 is an exploded view of certain internal portions of the spindle adapter shown in FIGURE 3.

Referring to FIGURES 4–6 along with FIGURE 3, the body portion 22 is provided at its upper end with a link member 24 pivoted at its center as indicated at 25 and provided with a pair of pins 26, 27 placed on opposite sides of the pivot point 25 at equal distances therefrom. Two parallel slide members 31 and 32 placed on opposite sides of the guide channel 23 are respectively mounted at one end on the pins 26, 27. A portion of one slide member 31 extends laterally from the supporting pin 26 therefor over the member 24 midway between the slide members, and is provided with an upwardly extending stud projection 35. The end of the other slide member 32 opposite or remote from the supporting pin 27 therefor has a laterally extending portion also provided with an upwardly extending stud projection 36 located midway between slide members 31, 32. An arm 37 of the slide member 31 opposite the supporting pin 26 therefor extends laterally between the stud projection 36 of the slide member 32 and the guide channel 23 and has a horizontally extending finger 38 which extends a short distance over the guide channel 23 at the center of the body portion 22. A second finger extension 39 on the arm 37 of the slide member 31 projects into a thrust spring 42 which lays in a small trough 43 cut into the top of the body portion 22 as shown. The thrust spring 42 thus biases the slide members 31, 32 to a normally outermost position of each of the diametrically opposed stud projections 35, 36.

An asssembly base 44 mounted on the body portion 22 houses a pair of oppositely disposed record supporting shoulders or shelves 45 and 46 which are provided with respective rectangular openings 47 and 48 near their inner edges through which the respective stud projections 35 and 36 extend. A pair of oppositely disposed record separators or record separating knives or blades 51 and 52 are slidably mounted on the respective shelves 45 and 46. The blade 51 resting on top of the shelf 45 has an arm 53 which extends toward the oppositely disposed shelf 46 and which is provided with a finger-like extension 54 having an opening 55 through which the stud projection 36 extends. Similarly the blade 52 has an arm 56 extending toward the shelf 45 and having a finger 57 provided with an opening 58 through which the stud projection 35 extends.

The assembly base 44 is provided with an opening 61 and the arms 53 and 56 of the respective separator blades 51 and 52 are mounted parallel to each other on opposite sides of the assembly base opening 61. A pair of parallel thrust springs 62, 63 placed between the shelves 45, 46 on opposite sides of the assembly base opening 61 bias the shelves 45, 46 outwardly and against the respective stud projections 35, 36 extending therethrough.

A cap 65 for the adapter 20 is mounted on top of the assembly base 44 and is secured with the assembly base to the body portion 22 in a suitable manner, as by a pair of screws extending through aligned openings in the body portion 22 and assembly base 44 and into internally threaded openings in the cap 65.

The guide channel 23 in the body portion 22 has a center portion 66 and an off center portion 67, and preferably has a configuration corresponding to the outer peripheral dimensions of the spindle shank 11 and the eccentric spindle head 13 when viewed from the upper end of the spindle. As is well known, this configuration is substantially that which can be traced around two circular disks of equal radii which overlap to the extent of the radius. The guide channel 23 is so located in the body portion 22 that, when the adapter 20 is placed on the spindle 10, the centers of the shank 11 and spindle head 13 are on a line midway between and parallel to the slide members 31, 32, the shank 11 extends through the center portion 66 of the guide channel 23, and the spindle head 13 extends through the off-center portion 67.

The assembly base 44 and the cap 65 are provided respectively with openings 61 and 68 placed off center therein and aligned with the off-center portion 67 of the guide channel 23 to provide passage for the spindle head 13 into the cap 65. Upon placement of the adapter 20 over the spindle 11, the top of the spindle head 13 extends to the top of the cap opening 68, thereby to suspend or support the assembled body portion 22, assembly base 44 and cap 65 above the turntable 12.

The bushing 21, the outer wall of which is cylindrical and concentric with the center portion 66 of the guide channel 23, extends a short distance below the body portion 22 and is surrounded by a roller element 71 of the diameter of the body portion 22.

The roller 71 has a relatively short concentric interval sleeve 72 at the upper end thereof through which the bushing 21 extends. A retaining element 73 placed around the bushing 21 below the sleeve 72 provides against the roller 71 slipping off the lower end of the bushing 21.

The internal sleeve 72 of the roller 71 is of a length slightly less than the distance between the lower end of the body portion 22 and the retaining element 73. With the adapter 20 placed over the spindle 10 and suspended above the turntable as hereinbefore described, the roller 71 engages the turntable 12 at its lower end, and its upper end is separated from the lower end of the body portion 22 by a small gap.

In the position of the adapter 20 on the spindle 10 during record playing intervals, a stack of records 76, 77 of the appropriate large center hole type placed over the cap 65 is supported above the turntable 12 with the lowermost record 77 resting on the oppositely disposed shelves 45, 46. Also, the roller 71, due to friction between the lower end thereof and the turntable 12, rotates with the turntable. The push-off finger 16 during record playing intervals is biased within the shank as hereinbefore mentioned.

Figure 8:
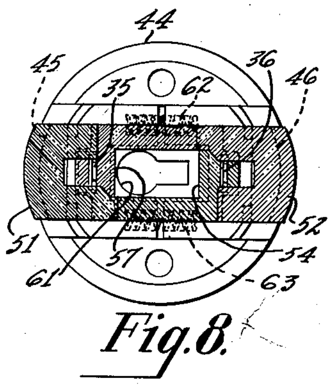
FIGURE 8 is a top plan view showing further details of the arrangement of certain portions of the spindle adapter, as shown in FIGURE 4, during a record change cycle.

During record change cycles, and attention is here directed particularly to FIGURES 7 and 8, when the push-off finger 16 is moved by its control mechanism in the manner hereinbefore mentioned, the upper end of the push-off finger 16 at the outer edge thereof engages the finger 38 of the slide member 31 and moves the slide member 31 against the tension of the thrust spring 42, thereby effecting the simultaneous movement of the other slide member 32 in the opposite direction and the movement of the two stud projections 35, 36 inwardly toward each other. By virtue of the linkage of one stud projection 35 with the shelf 45 and the oppositely disposed separator blade 52, inward movement of such stud projection 35 effects the withdrawal of the shelf 45 inside the assembly base 44 and the projection of the blade 52 outwardly from the assembly base; simultaneously, the withdrawal of the other shelf 46 and the projection of the other blade 51 is effected by the inner movement of the stud projection 46.

The blades 51, 52 in the above described movement project between the lowermost record 77 and the next lowermost record of the stack 76 and the shelves 45, 46 upon being withdrawn inside the assembly base 44 release the lowermost record 77, whereupon such lowermost record falls to the turntable to be played.

After the selection of a record in the manner described, the push-off finger 16 is released by its control mechanism and permitted to return to the inoperative position it normally occupies during record playing intervals, whereupon the slide members 31, 32 are returned to the outwardly biased positions of the stud projections 35, 36 under the influence of the thrust spring 42; the shelves 45, 46 thus project outwardly from and the blades 51, 52 are withdrawn inside the assembly base 44, the remaining records of the stack 76 setling with the next lowermost record resting on the shelves 45, 46.

The roller 71 by virtue of its rotation with the turntable 12 aids in assuring the proper speed of rotation of the records being played. Since a relatively large lateral surface at the center hole of a large center hole type record placed thereon is presented to the roller 71, slippage of the record is prevented by having the roller rotate with the turntable, in the manner described, at the speed at which the record is designed to be turned.

Clearly the adapter 20 may be used with either multi-speed or single-speed record changers employing the standard small size turntable spindle in the manner hereinbefore explained for accommodating such changers to play records of the enlarged spindle hole type. The turntable speed employed is important in that it should be the correct speed for the records which the adapter 20 is employed to effect playing by the record changer.

From the foregoing description, it is clear that there has been described a new and novel means for adapting automatic drop type record changers to play records having larger center holes than those which the record changers are designed to play. An auxiliary spindle placed over the turntable spindle with which a drop type record changer is equipped is operable to support a stack of records of the enlarged center hole type and employs a record changing apparatus operable periodically by a record change cycle control mechanism connected with the turntable spindle to effect sequential selection and playing of successive lowermost records of the stack.

What is claimed is:

1. In combination with an automatic phonograph record changer of the type providing record ejector means in the turntable spindle thereof, a spindle adapter having a straight cylindrical housing detachably mounted on and concentrically surrounding the lower portion of said turntable spindle, the diameter of said adapter being substantially the same as the internal diameter of enlarged spindle hole records to be played, and record supporting and selecting means for said records housed in said adapter and positioned for engagement and operation by said ejector means to control the release of records from said spindle adapter.

2. An adapter for an automatic drop type phonograph record changer having a standard turntable spindle which includes a record change cycle control mechanism for effecting record changing operations, said adapter comprising an auxiliary spindle for receiving and supporting a stack of records of the enlarged center hole type and having a socket opening therein to receive and substantially completely enclose said turntable spindle, said auxiliary spindle having a straight cylindrical housing which is concentric with the lower portion of said turntable spindle when said auxiliary spindle is in position on said turntable spindle and record changing apparatus housed in said auxiliary spindle and operable by said control mechanism in a predetermined manner.

3. A device for adapting an automatic drop type phonograph record changer having a record changing control mechanism incorporated in the turntable spindle thereof for playing records having center holes larger than said turntable spindle, said device comprising an auxiliary spindle having a straight cylindrical housing of a diameter to receive enlarged center hole records, said housing having an axially extending socket opening therein for receiving and enclosing substantially the entire turntable spindle to position said auxiliary spindle in concentric relation with the lower portion of said turntable spindle, and record supporting and selecting apparatus housed in said auxiliary spindle for supporting a stack of records of the enlarged center hole type above the turntable during record playing intervals and being operable by said control mechanism to effect sequential selection and dropping of successive lowermost records of said stack.

4. A detachable spindle adapter for use with a standard turntable spindle of an automatic drop-type phonograph record changer, said turntable spindle being of the type having a shank portion and an eccentric spindle head extension above said shank portion, and which houses an automatically projecting record push-off member in said shank operable by a record change cycle control means to release records from a stack supported on said spindle, said adapter comprising an auxiliary spindle having a central guide channel therein for receiving said shank portion and said spindle head extension, said auxiliary spindle being symmetrical with respect to the central axis thereof and adapted to slip over and be seated on said turntable spindle concentrically with the shank portion thereof and being of a dimension to receive and provide a guide for a stack of records of the enlarged center hole type, record changing apparatus housed in said auxiliary spindle, said record changing apparatus normally adapted for supporting said stack of records above the turntable, and said push-off member during such record change cycle being operable to move said record changing apparatus from its normal position to effect selection and dropping of the lowermost record of the stack for playing.

5. A detachable spindle adapter as defined in claim 4, in which the record changing apparatus housed in the auxiliary spindle comprises at least one pair of oppositely disposed record supporting shelves normally projecting from said auxiliary spindle and a pair of oppositely disposed record separators slidably positioned respectively on said shelves in a normally retracted position, in which biasing means are provided comprising a pair of parallel slide members on opposite sides of the guide channel respectively coupling a shelf and an oppositely disposed separator for effecting movement of said shelves and said oppositely disposed separators upon movement of said respective slide members, means linking said slide members at one end, and in which the push-off member during each record change cycle engages a portion of one slide member to effect movement of said slide members.

6. A detachable spindle adapter as defined in claim 4, in which the record changing apparatus housed in the auxiliary spindle comprises at least one pair of oppositely disposed record supporting shelves and a pair of oppositely disposed record separators slidably positioned respectively on said shelves, in which biasing means are provided comprising a pair of parallel slide members on opposite sides of the guide channel respectively coupling a shelf and an oppositely disposed separator, means linking said slide members at one end, thrust spring means in said auxiliary spindle normally biasing said slide members so that said shelves coupled thereto project outwardly to support the lowermost of the stack of records and the separators are withdrawn inside said auxiliary spindle, and in which the push-off member during a record change cycle engages a portion of one slide member to effect movement of said slide members against said thrust spring means, whereby said separators project outwardly between the lowermost and next lowermost records of the stack and said shelves are withdrawn to release said lowermost record to drop to the turntable to be played during each record change cycle.

7. A detachable spindle adapter as defined in claim 6, in which the auxiliary spindle comprises a body portion, an assembly base portion mounted on said body portion, a cap portion mounted on said assembly base portion, and a concentric bushing within said body portion, in which the record changing apparatus is housed in said assembly base portion, and in which the guide channel comprises an opening in the body portion having a center portion for receiving the shank and an off-center portion for receiving the spindle head, an opening in said assembly base portion having center and off-center portions aligned with the opening in said body portion, and an opening extending into said cap portion being aligned with the off-center portions of the other openings, whereby said spindle head can extend up into said cap portion to the extent of the opening therein.

8. A detachable spindle adapter as defined in claim 7, in which the bushing extends below the body portion, and in which a roller element surrounds said bushing extension and is mounted thereon for limited longitudinal movement therealong, said roller in the position of the auxiliary spindle on the turntable spindle having its lower end engaging the turntable and being rotatable therewith by virtue of the friction therebetween.

9. A detachable adapter as defined in claim 7, in which the record changing apparatus is housed in the assembly base portion, in which the linking means comprises a link member pivotally mounted on said body portion, in which the slide members are coupled respectively to said link member on opposite sides of the pivot thereof, and in which the respective shelves and oppositely disposed separators have openings therein and are coupled by respective projecting portions on the slide members which extend through said openings.

10. A spindle adapter for placement on a standard turntable spindle of an automatic drop type record changer, in which the turntable spindle comprises a shank portion, a spindle head extending from said shank portion in eccentric relation thereto, and cooperative elements in said shank and spindle head operable in a predetermined manner during record change cycles, said spindle adapter comprising, in combination, a main body portion, an assembly base mounted on said body portion, a cap portion mounted on said assembly base, a bushing extending axially through said body portion and having an opening therein for receiving the shank portion of said turntable spindle in coaxial relation therewith, said assembly base and said cap portion having openings aligned with a portion of the opening in said body portion to receive said spindle head, record changing apparatus supported in said assembly base, said record changing apparatus normally adapted for supporting the lowermost of a stack of records of the enlarged center hole type placed over said cap portion to be played, and said cooperative elements being operable during record change cycles to effect sequential release of successive lowermost records of said stack by said record changing apparatus.

11. In combination with an automatic phonograph record changer of the type providing record changing control mechanism incorporated in the turntable spindle thereof, an auxiliary spindle which is symmetrical with respect to the central axis thereof and which is adapted to be mounted on and completely enclose said turntable spindle concentric with the lower portion thereof, the outside dimensions of said auxiliary spindle being substantially the same as the internal dimensions of enlarged spindle hole records to be played, further record changing control mechanism for said enlarged spindle hole records housed in said auxiliary spindle, and said further record changing control mechanism positioned for engagement with and operation by said record changing control mechanism carried by said turntable spindle to control the selection and release of records from said auxiliary spindle.

12. In combination with an automatic phonograph record changer of the type providing record changing control means incorporated in the turntable spindle thereof, a spindle adapter having a cylindrical housing detachably mounted on and substantially completely enclosing the entire turntable spindle and concentric with the lower portion thereof, the outside diameter of said adapter being substantially the same as the internal diameter of the enlarged spindle hole records to be played, and further record changing control means for said records housed in said adapter and positioned for engagement with and operation by said first named record changing control means to control the selection and release of records from said spindle adapter.

13. An adapter for an automatic phonograph record changer having a turntable and a turntable spindle of relatively small diameter which spindle includes record change cycle control mechanism for effecting record changing operations, said adapter comprising a unitary auxiliary spindle structure adapted to be detachably mounted on said turntable spindle and to extend to said turntable for centering large center hole records on said turntable, said adapter having a socket opening therein to receive said turntable spindle and for centering said adapter with respect to said turntable, record changing control means housed in said adapter for supporting and centering with respect to the turntable a stack of records of the enlarged-center-hole type comprising at least a pair of record supporting shelves normally projecting from said adapter and at least a pair of record separators positioned respectively above said shelves in normally retracted position within said adapter, means interlinking said shelves and said separators for concurrent operation, and means positioning said record changing control means for engagement with and operation by said control mechanism included in said relatively small diameter spindle.

14. For use with a phonograph record changer having a rotatable turntable and coaxially thereof an upstanding spindle of relatively small diameter provided intermediate its ends with means to support a stack of records having center holes of correspondingly small diameter, said spindle mounting within itself record supporting and releasing means to select and release successive lowermost records to said turntable, an auxiliary spindle having a unitary housing adapted to slip over and extend along the entire length of said first named spindle and freely detachable therefrom for receiving and centering a stack of large center hole record with respect to the axis of said turntable, and further record supporting and releasing means for said records housed in said auxiliary spindle and positioned for engagement with and operation by said first named supporting and releasing means to control the successive selection and release of records from said auxiliary spindle to said rotatable turntable, and a portion of said auxiliary spindle housing extending to said turntable for centering the large diameter center hole records released to said turntable.

15. For use with a phonograph having a rotatable turntable and coaxially thereof an upstanding spindle of relatively small diameter provided intermediate its ends with means to support a stack of reserve records having center holes of correspondingly small diameter, said spindle mounting within itself record changing control means, a spindle adapter having a housing with a straight central axis seated on and completely enclosing the entire spindle and freely detachable therefrom for receiving and centering a stack of reserve records having relatively large diameter center holes with respect to the lower portion of the spindle, said spindle adapter housing having an axial opening for receiving said spindle, and further record changing control means for said records housed in said adapter and positioned for engagement with and operation by said first named record changing control means to control the release of records from said spindle adapter.

16. For use with a phonograph record changer having a rotatable turntable and coaxially thereof an upstanding spindle of relatively small diameter provided intermediate its ends with means to support a stack of records having center holes of correspondingly small diameter, said spindle mounting within itself record supporting and releasing means to select and release successive lowermost records to said turntable; a unitary auxiliary spindle for large diameter center hole records having a housing adapted to be seated on and substantially completely enclose said first named spindle throughout substantially the entire length thereof, said housing including an upper portion and a rotatable lower portion mounted on said upper portion in axially aligned relation therewith and for rotation with respect thereto, said lower portion adapted to extend to and concentrically engage and rotate with said turntable when the unitary auxiliary spindle is positioned on said upstanding spindle; and further record supporting and releasing means for said records housed in said upper portion of said housing and positioned for engagement with and operation by said first named supporting and releasing means to control the selection and release of successive lowermost records along said auxiliary spindle to said rotatable turntable, whereby said records are centered on said turntable by said rotatable lower portion of said auxiliary spindle housing.

17. For use with a phonograph having a rotatable turntable and coaxially thereof an upstanding spindle of relatively small diameter provided intermediate its ends with means to support a stack of reserve records having center holes of correspondingly small diameter, said spindle mounting within itself record changing control means; a spindle adapter including a housing having an axial opening for receiving and completely enclosing said spindle of relatively small diameter, said housing having a straight central axis and external dimensions for receiving and centering with respect to the rotatable turntable a stack of reserve records having relatively large diameter center holes; said spindle adapter housing having an upper portion adapted to be seated on and fixed with respect to said spindle of relatively small diameter; record changing control means for said records housed in said upper portion and positioned for engagement with and operation by said first named record changing control means to control the release of records from said spindle adapter; and a rotatable lower portion for said spindle adapter housing rotatably mounted on said upper portion in axially aligned relation therewith, said lower portion adapted to engage and be rotated by said turntable to center large diameter center hole records on said turntable when said spindle adapter is positioned on said uptsanding spindle.

18. An adapter for an automatic phonograph record changer having a turntable and turntable spindle of relatively small diameter which spindle extends upwardly from the turntable center and includes record change cycle control mechanism for effecting record changing operations comprising a unitary auxiliary spindle structure adapted to slip over and surround the turntable spindle throughout substantially the entire length thereof, said auxiliary spindle structure including a main body portion and a rotatable portion mounted on said main body portion for rotation with respect thereto, said rotatable portion adapted to extend to and concentrically engage said turntable for rotation therewith when the auxiliary spindle is positioned on said turntable spindle, record supporting and releasing apparatus housed in said main body portion for supporting a stack of records of the enlarged-center-hole type comprising at least a pair of record supporting shelves normally projecting from said main body portion and at least a pair of record separators positioned respectively above said shelves in normally retracted position within said main body portion, means interlinking said shelves and said separators for concurrent operation, and means positioning said record supporting and releasing means for engagement with and operation by said control mechanism included in said small diameter spindle.

19. A spindle adapter for an automatic phonograph record changer of the type having a stationary standard small diameter turntable spindle which includes control mechanism for effecting record changing operations, said spindle adapter comprising auxiliary spindle body means adapted to be mounted on said stationary turntable spindle, said auxiliary spindle body means including means for receiving and supporting a stack of records of the large centerhole type, said auxiliary spindle body means having a socket opening for receiving said turntable spindle, said auxiliary spindle body means when mounted on said stationary turntable spindle having a lower portion extending to said turntable to center large centerhole records on the turntable, and motion translating means housed in the upper portion of said spindle body means responsive to actuation of the control mechanism of said stationary turntable spindle for releasing the lowermost record from a stack of records supported on said auxiliary spindle body means.

20. An adapter as defined by claim 20, wherein said lower portion of said auxiliary spindle body means is secured to the upper portion thereof to provide a composite structure adapted to be mounted on or detached from said stationary spindle as a single unit.

References Cited in the file of this patent

UNITED STATES PATENTS

| | | |
|---|---|---|
| 1,568,130 | Blackwell | Jan. 5, 1926 |
| 2,523,045 | Miller et al. | Sept. 19, 1950 |
| 2,549,246 | Schweitzer | Apr. 17, 1951 |
| 2,651,523 | Dale | Sept. 8, 1953 |
| 2,666,647 | Dale | Jan. 19, 1954 |

UNITED STATES PATENT OFFICE
CERTIFICATE OF CORRECTION

Patent No. 3,071,380 January 1, 1963

Roland Di Sabatino

It is hereby certified that error appears in the above numbered patent requiring correction and that the said Letters Patent should read as corrected below.

Column 1, line 49, for "chaners" read -- changers --; line 59, for "Acordingly" read -- Accordingly --; column 2, line 17, for "interual" read -- internal --; line 35, for "detechable" read -- detachable --; column 5, line 29, for "setling" read -- settling --; column 10, lines 2 and 3, for "uptsanding" read -- upstanding --; line 49, for the claim reference numeral "20" read -- 19 --.

Signed and sealed this 1st day of October 1963.

(SEAL)
Attest:

ERNEST W. SWIDER
Attesting Officer

DAVID L. LADD
Commissioner of Patents